Figure 1:
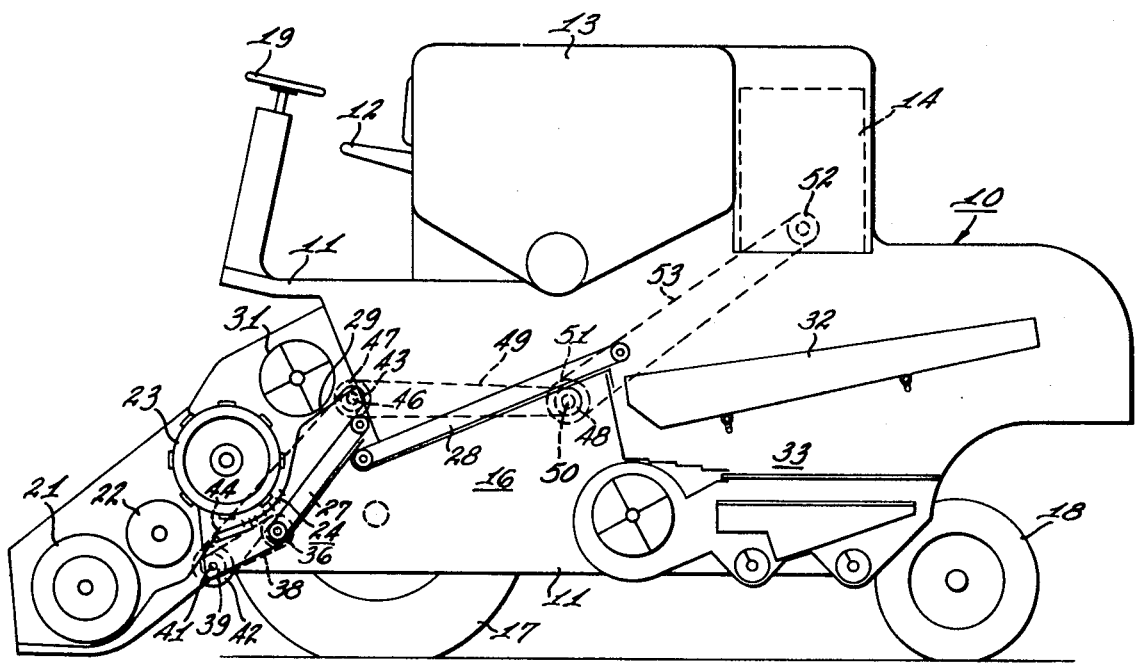

United States Patent

[11] 3,604,427

| [72] | Inventors | Jerry C. Boone;<br>Edgar S. Miller, both of Independence, Mo. |
|---|---|---|
| [21] | Appl. No. | 5,700 |
| [22] | Filed | Jan. 26, 1970 |
| [45] | Patented | Sept. 14, 1971 |
| [73] | Assignee | Allis-Chalmers Manufacturing Co.<br>Milwaukee, Wis. |

[54] COMBINE HARVESTER
3 Claims, 2 Drawing Figs.

| [52] | U.S. Cl. | 130/27 K |
|---|---|---|
| [51] | Int. Cl. | A01f 7/00 |
| [50] | Field of Search | 130/27 R,<br>27 J, 27 K, 27 L, 27 W |

[56] References Cited
UNITED STATES PATENTS

| 2,159,664 | 5/1939 | Lindgren | 130/27 J |
| 2,686,523 | 8/1954 | Young | 130/27 J |
| 3,191,607 | 6/1965 | Baumeister et al. | 130/27 K |

*Primary Examiner*—Louis G. Mancene
*Assistant Examiner*—J. A. Oliff
*Attorneys*—Kenneth C. McKivett, Charles L. Schwab and Robert B. Benson ABSTRACT: A combine harvester is provided with a threshing cylinder, an underlying coacting open concave and a conveyor underlying the concave for moving threshed material passing through the open concave to a cleaning shoe. The method of changing the open concave to a closed concave by disconnecting the conveyor drive and permitting the threshed material to fill the space between the conveyor and the upper surface of the concave.

PATENTED SEP 14 1971

3,604,427

Inventors
Jerry C. Boone
Edgar L. Miller
By Kenneth C. McKivett
Attorneys

COMBINE HARVESTER

The present invention relates to a combine harvester and more particularly to a method for adapting an open concave to a closed type of concave with a minimum effort.

Conventional combine harvesters include a threshing cylinder driven at a desired speed and a concave located radially adjacent to the cylinder. Crop material is introduced in the space between the periphery of the cylinder and the surface of the concave. The periphery of the cylinder may be of the rub bar or spike tooth type both of which are irregular surfaces, and also the surface of the concave is irregular being made up of spaced bars and rods. The spacing between concave and cylinder is adjusted in conformity with the crop being handled. Different types of devices are available for attachment to both the cylinder and the concave which can be installed by the operator to provide the desired threshing action.

Concave filler bars are installed in open concave machines to increase the aggressiveness of the threshing action. Without them, there are some crop conditions where heads of grain, only partly threshed, will fall through the first concave openings and pass on into the cleaning portion of the combine and then, either go out the back of the combine or recirculate in the tailings system to be run through the cylinder again, increasing the threshing load. By installing the filler bars or otherwise converting to a closed concave, these heads cannot escape through the concave and are then subjected to more tumbling, rubbing and threshing action by the cylinder.

These insert devices may take the form of inserts, filler elements or longitudinal strips which are positioned between the threshing concave bars and which are bolted or secured to the concave itself. Since there may be times during the working day when the operator wishes to change the threshing action of the machine, it is desirable to provide means for accomplishing this change in a minimum amount of time and with a minimum amount of effort. In the usual combine harvester, the concave is located in a rather inaccessible spot making it very difficult to make any structural changes in the concave. Accordingly, the present invention is a method of operating a combine to provide either an aggressive concave or a relatively nonaggressive concave with a minimum amount of work and in a minimum length of time.

It is a further object of this invention to provide means for readily converting an open concave machine to a closed concave machine.

Another object of this invention is to provide inexpensive means for readily converting an open concave machine to a closed concave machine or vice versa.

Another object of this invention is to provide a method for converting an open concave machine to a closed concave without requiring additional structure.

Figure 2:
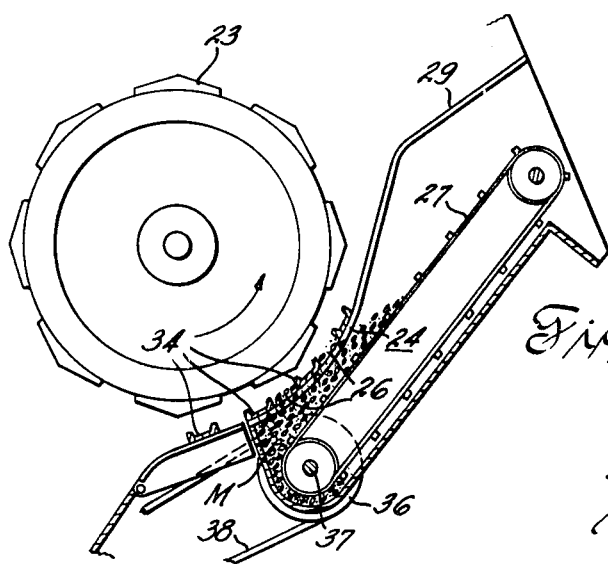

The foregoing and other important objects and desirable features inherent in and encompassed by the invention will become apparent in the following description and accompanying sheet of drawing in which:

FIG. 1 is a side elevation of a combine harvester embodying the invention with parts removed for clarity of illustration; and FIG. 2 is an enlarged portion of the machine shown in FIG. 1.

Referring to FIG. 1 the invention is embodied in a self-propelled combine harvester 10 having a main frame 11 supporting an operator's seat 12, a grain tank 13, an internal combustion engine 14 and a harvesting, threshing and cleaning mechanism 16. The foregoing are supported at the forward end on traction wheels 17 which are operatively connected to engine 14 by means not shown. The rearward end of the combine is supported on dirigible wheels 18 operatively connected to steering wheel 19.

An auger 21 positioned at the left-hand end of the combine is operatively connected (by means not shown) to engine 14 for moving harvested material rearwardly to a beater member 22 which in turn delivers the material to the space between threshing cylinder 23 and concave 24. The material is threshed by the coaction of cylinder 23 and concave 24 with part of the threshed material dropping through openings 26 in concave 24 onto conveyor 27 from whence it is delivered to conveyor 28.

The other part of the threshed straw and material leaves cylinder 23 and concave 24 and passes over concave extension 29 and under beater 31 onto conveyor 28.

Conveyor 28 deposits the straw on strawrack 32 and the threshed material onto cleaning shoe 33 which separates the grain from the chaff and straw particles and delivers the clean grain to grain tank 13 by conventional means (not shown).

Referring to FIG. 2, it is seen that concave 24 is made up of a series of U-shaped channel members 34 which are spaced apart in a circular path about cylinder 23 to provide openings 26 therebetween through which threshed material can pass to conveyor 27.

Referring to FIG. 2, conveyor 27 is provided with a V-belt pulley 36 which is attached to driven shaft 37. V-belt pulley 36 and 37 are driven by V-belt 38 which is driven by pulley 39 (see FIG. 1) attached to shaft 41. A pulley 42 is also attached to shaft 41 and is drivenly connected to pulley 43 by means of a V-belt 44. Pulley 43 is attached to shaft 46 which also has attached thereto a pulley 47 which is drivenly connected to pulley 48 by V-belt 49. Pulley 48 is attached to shaft 50. A pulley 51 is also attached to shaft 50 and is drivenly connected to pulley 52 by means of V-belt 53. Pulley 52 is driven by engine 14.

As previously stated, it is sometimes desirable to alter the aggressiveness of the threshing operation and this can be done by changing the peripheral surface of the concave. The present invention provides a method for filling in the openings across the concave. This method is as follows:

Remove belt 38. Conveyor 27 now will no longer be driven and if the combine harvester is operated without conveyor 27 being driven openings 26 between concave member will become filled with threshed material (as shown in FIG. 2 and marked M) which accumulates on the upper surface of conveyor 27. This material will provide concave 24 with a relatively smooth upper surface. With openings 26 being closed all the material passing between cylinder 23 and concave 24 passes over concave extension 29 onto straw rack 32 which separates the straw from the grain and permits the grain to drop through the rack to cleaning shoe 33 from where it is conveyed to grain tank 13.

Now if it is desired to operate the machine as an open concave machine all that has to be done is reconnect belt 38 into driving relation to conveyor 27 and the collected material M shown in FIG. 2 will soon be deposited into cleaning shoe 33 by conveyor 27 and the combine has been converted into an open concave machine with the greatest of ease and at no expense and with no additional structure.

The embodiments of the invention in which an exclusive property or privilege is claimed are defined as follows:

1. The method of converting an open concave combine to a closed concave combine harvester wherein said harvester includes a power-driven threshing cylinder overlying said concave, a separating mechanism positioned over a cleaning shoe for receiving threshed material passing over said concave, a conveyor for moving threshed material passing through said concave to said cleaning shoe, power transmission means connecting a power source with said conveyor for driving same, the method comprising:

1. disconnecting said power transmission means, and
  2. operating said harvester to fill the space between said concave and said conveyor with harvested material.

2. The method recited in claim 1 and wherein the openings in said concave are filled to the upper surface of said concave thereby providing a surface comprised of harvested material coacting with said cylinder.

3. The method recited in claim 2 and wherein said power transmission means comprises a V-belt.